(12) United States Patent
Ohba

(10) Patent No.: US 7,716,426 B2
(45) Date of Patent: May 11, 2010

(54) PREFETCH COMMAND CONTROL METHOD, PREFETCH COMMAND CONTROL APPARATUS AND CACHE MEMORY CONTROL APPARATUS

(75) Inventor: Akio Ohba, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 334 days.

(21) Appl. No.: 11/671,831

(22) Filed: Feb. 6, 2007

(65) Prior Publication Data

US 2007/0130428 A1    Jun. 7, 2007

Related U.S. Application Data

(63) Continuation of application No. 10/836,039, filed on Apr. 29, 2004, now Pat. No. 7,451,276.

(30) Foreign Application Priority Data

May 14, 2003    (JP)    ............... 2003-136387

(51) Int. Cl.
*G06F 12/08*    (2006.01)
(52) U.S. Cl. .................... 711/137; 711/167
(58) Field of Classification Search ............ 711/137, 711/167, 170; 713/1, 2, 100; 717/140, 141, 717/151; 712/207
See application file for complete search history.

(56) References Cited

U.S. PATENT DOCUMENTS 5,835,745 A    11/1998    Sager et al.
5,835,967 A    11/1998    McMahan
5,854,934 A *  12/1998    Hsu et al. .................... 711/137
6,314,431 B1 * 11/2001    Gornish ...................... 711/125
6,381,679 B1    4/2002    Matsubara et al.

(Continued)

FOREIGN PATENT DOCUMENTS

EP    0 557 077 A1    8/1993
EP    1 096 371 A1    5/2001

(Continued)

OTHER PUBLICATIONS

Lee et al., "On Augmenting Trace Cache for High-Bandwidth Value Prediction", IEEE Transactions on Computers, vol. 51, iss. 9, Sep. 2002, pp. 1074-1088.*

(Continued)

*Primary Examiner*—Pierre-Michel Bataille
(74) *Attorney, Agent, or Firm*—Fitch, Even, Tabin & Flannery

(57) ABSTRACT

A prefetch command control apparatus is provided. A protocol slot generation unit, when receiving from a CPU a prefetch command in which a utilization time of data to be prefetched is specified, generates a protocol slot based on the utilization time and registers it in a schedule list storage unit. When receiving a regular access command, the protocol slot generation unit registers a protocol slot in a regular protocol queue storage unit. A cost evaluation unit evaluates an issuance cost of the prefetch command based on a cache retention time of data to be prefetched and evaluates an issuance cost of the regular access command based on a resource occupation cost. A protocol issuance unit decides which command shall be issued, the prefetch command or regular access command, based on the evaluation result of these issuance costs.

9 Claims, 10 Drawing Sheets

U.S. PATENT DOCUMENTS

| | | | |
|---|---|---|---|
| 6,633,891 B1 | 10/2003 | Bamford et al. | |
| 6,912,612 B2 | 6/2005 | Kapur et al. | |
| 7,243,195 B2 * | 7/2007 | O'Brien et al. | 711/159 |
| 7,424,578 B2 * | 9/2008 | Nakashima et al. | 711/137 |
| 7,451,276 B2 * | 11/2008 | Ohba | 711/137 |
| 2003/0005419 A1 * | 1/2003 | Pieper et al. | 717/141 |
| 2003/0088864 A1 | 5/2003 | Tirumalai et al. | |
| 2004/0133747 A1 | 7/2004 | Coldewey | |
| 2004/0230748 A1 * | 11/2004 | Ohba | 711/137 |
| 2005/0086653 A1 * | 4/2005 | Heishi et al. | 717/140 |
| 2008/0244232 A1 * | 10/2008 | Sherman et al. | 712/207 |

FOREIGN PATENT DOCUMENTS

| | | |
|---|---|---|
| JP | 2001344153 | 12/2001 |
| JP | 2004348175 A | 12/2004 |
| WO | 02/08893 A1 | 1/2002 |

OTHER PUBLICATIONS

Japanese Patent Office; "Notification of Reason(s) for Refusal;" for corresponding Japanese Patent Application No. 2003-136387; Mar. 13, 2007; 4 pages which includes English language translation.

Patent Cooperation Treaty; "International Search Report;" for corresponding PCT Application No. PCT/JP2004/005777; Feb. 3, 2006; 4 pages.

Patent Cooperation Treaty; "Written Opinion of the International Searching Authority;" for corresponding PCT Application No. PCT/JP2004/005777; Feb. 3, 2006; 5 pages.

Patent Cooperation Treaty; "Notification of Transmittal of the International Search Report and the Written Opinion of the International Searching Authority, or the Declaration;" for corresponding PCT Application No. PCT/JP2004/005777; Feb. 3, 2006; 3 pages.

USPTO, "Notice of Allowance and Fee(s) Due," for parent U.S. Appl. No. 10/836,039, mailed on Jun. 30, 2008, 7 pages.

Patterson et al., "Informed Prefetching and Caching," Proc. of the 15th ACM Symp. on Operating System Principles, Dec. 1995, pp. 79-95.

Japanese Patent Office; "Notification of Reason(s) for Refusal;" for corresponding Japanese Patent Application No. 2003-136387; May 29, 2007; 5 pages.

\* cited by examiner

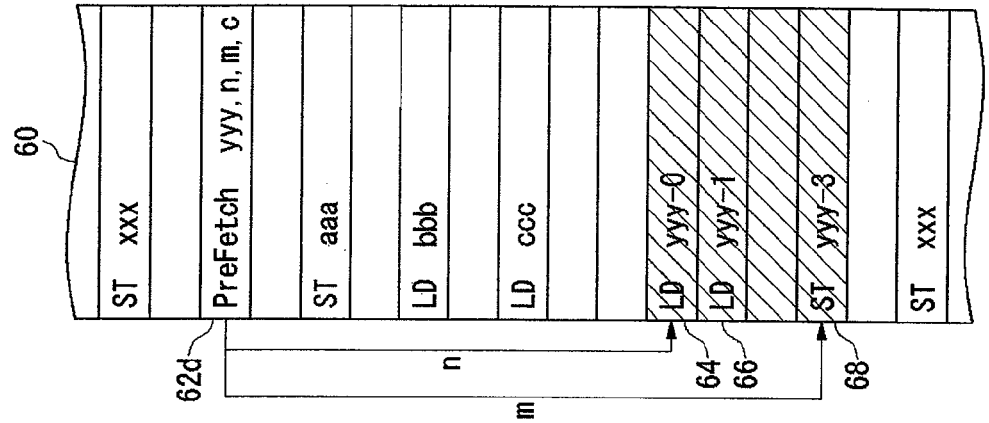
FIG.3A
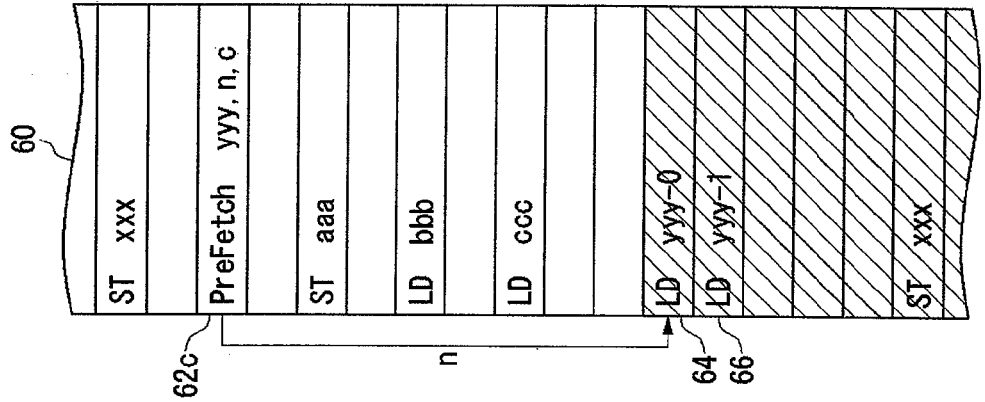
FIG.3B
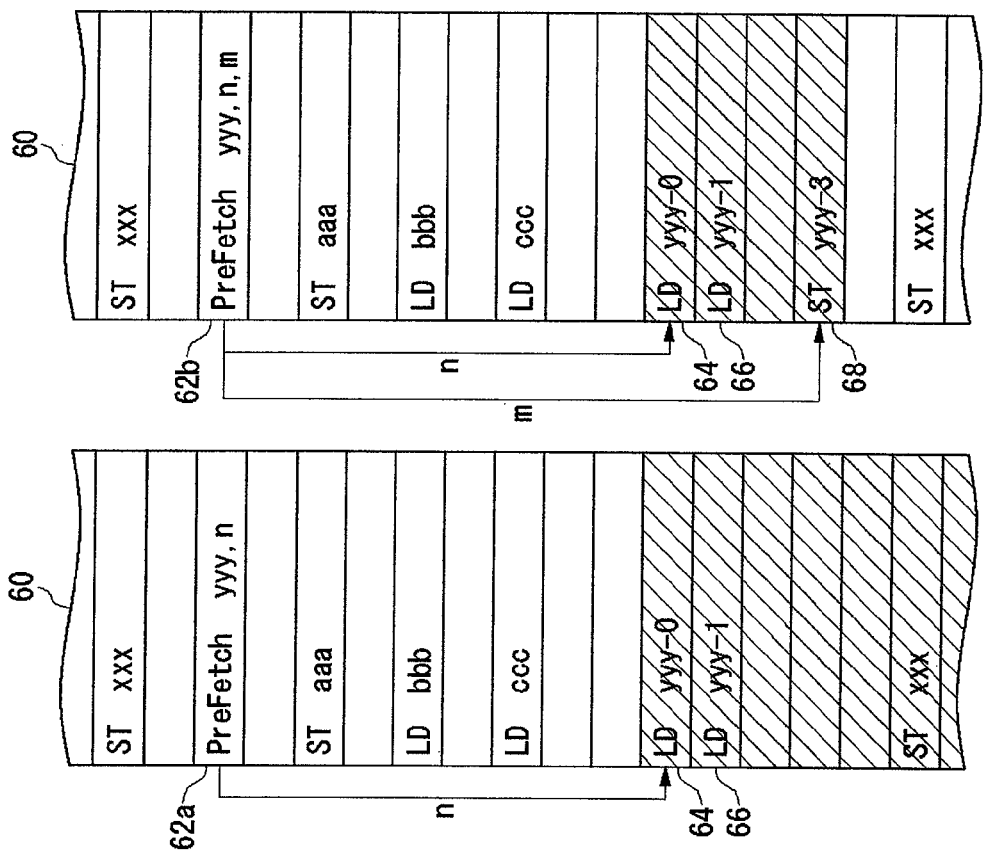
FIG.3C
FIG.3D

PREFETCH COMMAND CONTROL METHOD, PREFETCH COMMAND CONTROL APPARATUS AND CACHE MEMORY CONTROL APPARATUS

CROSS REFERENCE TO RELATED APPLICATIONS

This application is a continuation of U.S. patent application Ser. No. 10/836,039, filed on Apr. 29, 2004, entitled "PREFETCH COMMAND CONTROL METHOD, PREFETCH COMMAND CONTROL APPARATUS AND CACHE MEMORY CONTROL APPARATUS", now U.S. Pat. No. 7,451,276, which claims foreign priority under 35 U.S.C. 119 to Japanese Patent Application No. 2003-136387, filed May 14, 2003, both of which are hereby fully incorporated herein by reference in their entireties.

BACKGROUND OF THE INVENTION

1. Field of the Invention

The present invention relates to a cache control technology, and it particularly relates to prefetch command control method and apparatus and cache memory control apparatus.

2. Description of the Related Art

One aspect of referencing main memory such as I/O and DRAM by computer processor is locality. By taking advantage of this locality and copying frequently referenced data stored in main memory into the cache memory, which is a high speed accessible small capacity internal memory, and accessing the main memory through this cache memory, it is possible to reduce latency for memory access. As the processing performance of processors has improved, the importance of cache memory is also becoming greater in terms of high-speed data supply to the processor.

When the cache is hit, the processor can obtain necessary data at the access speed of the cache memory. But, in the case of a cache miss, the processor needs to stop program execution while data is transferred from the main memory to the cache memory. A cache miss occurs when a copy of the data in the main memory is not existent in the cache memory as a result of cached data being cached out due to a shortage of cache capacity or the data being accessed being referenced for the first time. In the former case, the problem can be avoided by increasing the cache memory capacity. However, when the cache memory capacity increases, the cost increases so that it is difficult to significantly increase the capacity. In the latter case, the problem can be avoided by using a method called prefetch, by which data expected to be used in the future are transferred to the cache memory in advance of execution.

Prefetch is an effective means to further reduce memory access time. However, a speculative prefetch may actually lower the efficiency of the cache memory. This is because if prefetch is used too often when the cache memory capacity is small, formerly cached data is cached out by the prefetched data. Since there is no definite guideline for which situation and time a prefetch command shall be issued, while many processors are prefetch command compatible, the actual state is that prefetch commands are often not used effectively.

SUMMARY OF THE INVENTION

The present invention has been made with the view to addressing the above-mentioned problems, and the object thereof is to provide a prefetch command control method and apparatus to enable efficient memory access and a cache memory control apparatus.

One embodiment provides a computer program executable by a computer, the program comprising: analyzing a source code and converting the source code into an intermediate code; determining data to be prefetched based on the intermediate code, and then inserting an access command for the data as a prefetch command into a position before an original execution sequence position, and adding information specifying a utilization time of the data in the prefetch command; and optimizing the intermediate code into which the prefetch command is inserted and generating an object code.

According to one aspect of the present invention, a prefetch command control method is provided. The method comprises generating a prefetch command for data with information specifying a utilization time of the data, and scheduling an issuance timing of the prefetch command according to the information specifying the utilization time.

The information specifying the utilization time in the prefetch command may include information specifying the data utilization start time or finish time by a relative time or by an absolute time. The issuance timing may be a time when a prefetch command is executed as an actual protocol for an external resource. The scheduling of the issuance timing may be adjusting a time when the prefetch command shall be issued, adjusting an order in which a plurality of prefetch commands shall be issued one by one. The issuance timing may be adjusted between a prefetch command and a regular access command such as a load command or a store command.

According to another aspect of the present invention, a prefetch command control apparatus is provided. The apparatus comprises a storage unit which stores a prefetch command for an external resource with information specifying data utilization time added; a cost evaluation unit which evaluates a cost which accrues due to a prefetched data staying in a cache by the specified utilization time when the stored prefetch command is issued; and an issuance unit which adjusts a timing when the stored prefetched command is issued for the external resource according to an evaluation result by the cost evaluation unit.

The cost evaluation unit may compare the issuance cost of the prefetch command with an issuance cost of a regular access command stored in an access request queue for the external resource and the issuance unit may decide which of the prefetch command and the regular access command shall be issued at a current time according to a comparison result by the cost evaluation unit. The cost evaluation unit may recalculate the issuance cost whenever the issuance unit issues a command and thereby update the issuance cost to be a value at a current time.

When the issuance cost of the prefetch command is evaluated, a cost which accrues due to an issuance lag of a regular access command stored in an access request queue for the external resource or a risk that the data to be prefetched is not prefetched by the data utilization time may be evaluated together.

According to still another aspect of the present invention, a cache memory control apparatus is provided. The apparatus comprises a cache memory which caches data obtained from an external resource and provides the cached data to a processor; a scheduler which schedules an access protocol for the external resource received from the processor and sets up the scheduled access protocol in a request queue for the external resource; and an external resource controller which reads the access protocol from the request queue and accesses the external resource to provide data to the cache memory. The scheduler is the above-mentioned prefetch command control apparatus.

The scheduler may lock a cache of the prefetched data in the cache memory during a period of time for which the prefetched data is utilized according to a utilization start time and a utilization finish time of the prefetched data included in the information specifying data utilization time, after the prefetch command is issued.

According to still another aspect of the present invention, a computer program executable by a computer is provided. The program comprises analyzing a source code and converting the source code into an intermediate code; determining data to be prefetched based on the intermediate code, and then inserting an access command for the data as a prefetch command into a position before an original execution sequence position, and adding information specifying a utilization time of the data in the prefetch command; and optimizing the intermediate code into which the prefetch command is inserted and generating an object code.

Moreover, any arbitrary replacement or substitution of the above-described structural components and the steps, expressions replaced or substituted in part or whole between a method and an apparatus as well as addition thereof, and expressions changed to a system, a computer program, a storage medium, a transmission medium or the like are all effective as and are encompassed by the present invention.

This summary of the invention does not necessarily describe all necessary features, so that the invention may also be a sub-combination of these described features.

BRIEF DESCRIPTION OF THE DRAWINGS

FIG. 3A through FIG. 3D are diagrams describing examples of programs into which an extended prefetch command has been inserted according to the compiling process in FIG. 2.

DETAILED DESCRIPTION OF THE INVENTION

The invention will now be described by reference to the preferred embodiments. This does not intend to limit the scope of the present invention, but to exemplify the invention.

Figure 1:
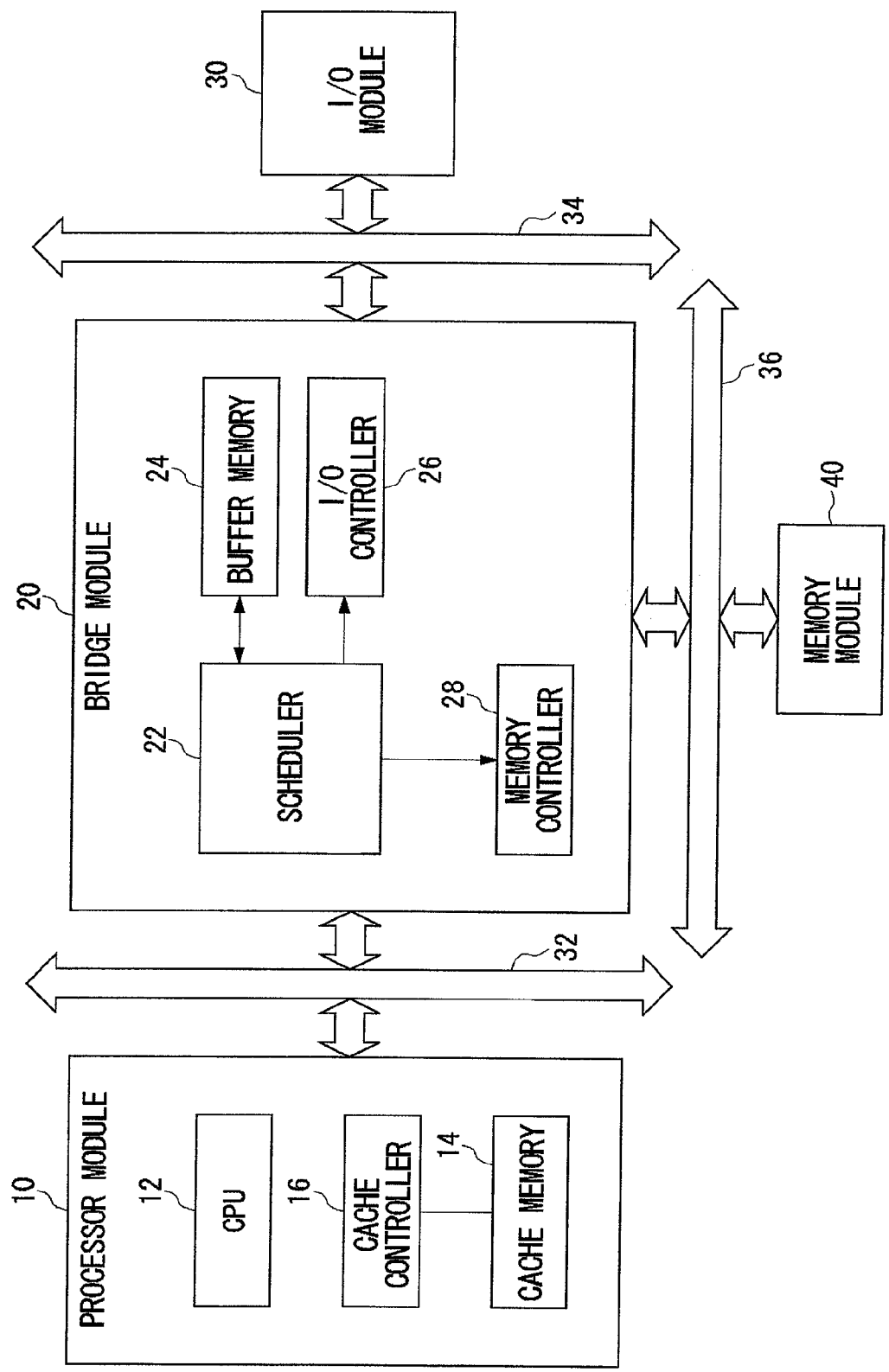
FIG. 1 is a block diagram of a processor system according to an embodiment of the present invention.

FIG. 1 is a block diagram of a processor system according to the embodiment of the present invention. This processor system includes the processor module 10, the bridge module 20, the I/O module 30, and the memory module 40. The processor module 10 is connected to the internal bus 32; the I/O module 30 to the I/O bus 34; and the memory module 40 to the memory bus 36. The bridge module 20 bridges the internal bus 32 and the I/O bus 34, and controls data read/write on the I/O module 30 by the processor module 10. The bridge module 20 bridges the internal bus 32 and the memory bus 36, and controls data read/write on the memory module 40 by the processor module 10.

The processor module 10 includes the CPU 12, the cache memory 14, and the cache controller 16. When the CPU 12 specifies the resource ID of an I/O or DRAM and a data address, and issues access protocols such as load command, store command, or prefetch command, the scheduler 22 of the bridge module 20 registers the access protocol slot in the buffer memory 24. The scheduler 22 controls static resource data such as the access waiting time and access speed of each resource, and dynamic data such as the wait state of the registered access protocols. Based on these data, timing for access protocol issuance is scheduled and access protocol is set up in the request queue of each resource.

The I/O controller 26 and the memory controller 28 read out the access protocols respectively set up in their request queue, and respectively access the I/O module 30 and the memory module 40 to read out the specified address data. The readout data is delivered to the cache controller 16 of the processor module 10 via the internal bus 32. The cache controller 16 caches said data in the cache memory 14, and at the same time provides the CPU 12 with said data. Then, when the CPU 12 accesses the data with the same address, the cache controller 16 delivers the cached data from the cache memory 14 to the CPU 12. In the case of a cache miss, the data is read out as described above via the bridge module 20.

The processor module 10 with the bridge module 20 is an example of a cache memory controller according to the present invention, and the scheduler 22 with the buffer memory 24 of the bridge module 20 is an example of a prefetch controller according to the present invention.

The CPU 12 executes the compiler loaded in the memory module 40 and compiles the source code of the program and generates the object code. In the generation process of this object code, a prefetch command is inserted.

Figure 2:
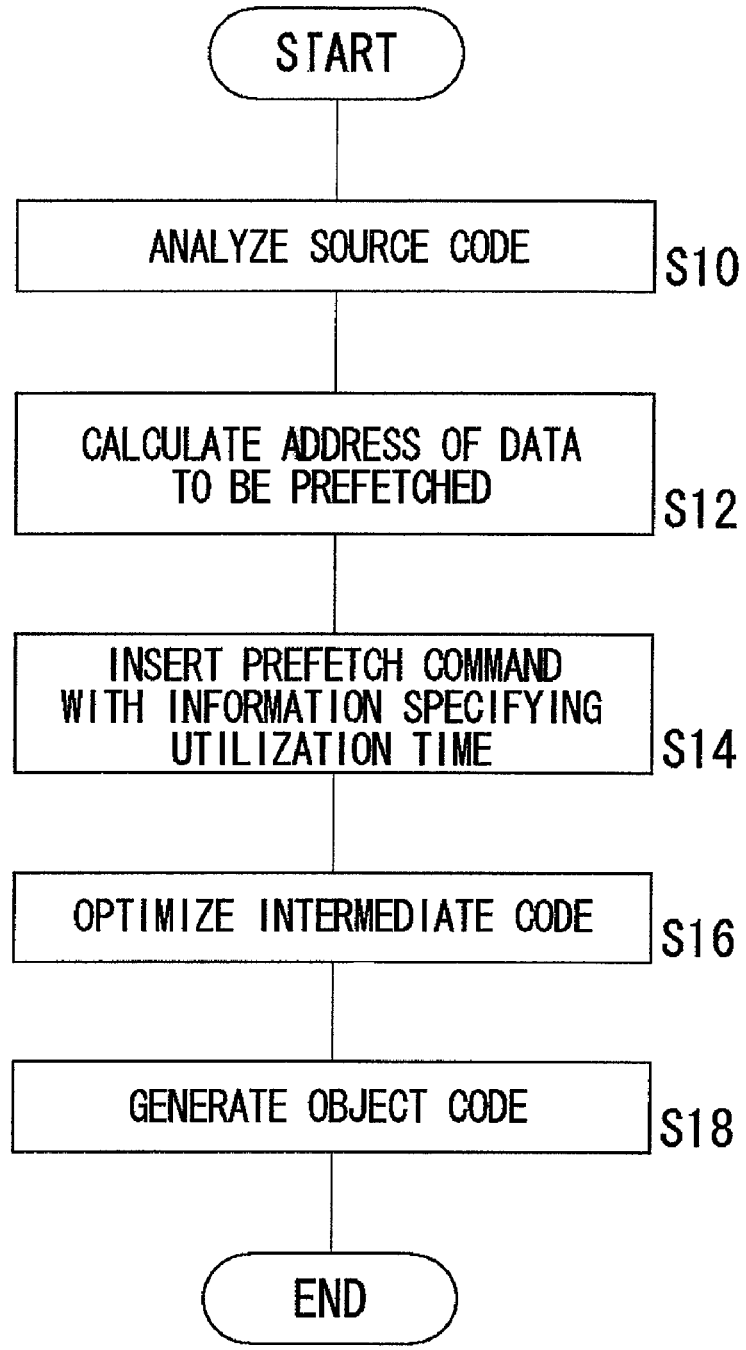
FIG. 2 is a flowchart describing a program compiling process according to an embodiment of the present invention.

FIG. 2 is a flowchart describing the program compiling process. The compiler analyzes the source code of the program and converts it into an intermediate code (S10). Then, the compiler determines the data to be prefetched among the data accessed by the load command based on the intermediate code, and calculates the address of that data (S12). Then, the compiler inserts the prefetch command, in which the address of that data is specified as an argument, into a position before the execution sequence position of the load command, and adds the information specifying the data utilization time as another argument in the prefetch command, which shows how many steps from the prefetch command insert position the actual data utilization time will be (S14). Thus, the compiler optimizes the intermediate code into which the prefetch command with the information specifying the data utilization time (hereinafter referred to as "extended prefetch command") is inserted (S16), and generates an object code (S18). The extended prefetch command can also be inserted by a carefully tuned assembler program, instead of the compiler.

FIG. 3A through FIG. 3D are diagrams describing examples of programs into which an extended prefetch command has been inserted according to the compiling process in FIG. 2. The program 60 includes access protocols such as the load command (LD), the store command (ST), and the extended prefetch command (PreFetch). In the example in FIG. 3A, the extended prefetch command 62a to pre-cache the data area yyy, which includes the data yyy-0 and yyy-1 for use in the load commands 64 and 66, is inserted into a position n steps before the execution sequence position of the load command 64.

For the arguments of the extended prefetch command 62a, the data area yyy to be prefetched, and the utilization start time n, are specified. With the utilization start time n, it is possible to know that access to the data area yyy starts at a position n steps from the insert position of the extended prefetch command 62a. However, it is not known whether or not there are accesses to the data area yyy at and/or after the position (n+1) steps from the said insert position. For normally arrayed data the consecutive data within the data area yyy are accessed simultaneously so that there is the possibility that data within the data area yyy may be used at and/or after the position (n+1) steps from said insert position. Therefore, what can only be judged from the utilization start time n of the extended prefetch command 62a is that there will be some access to the data area yyy at and/or after the position n steps from said insert position, as marked with diagonal lines.

In the example in FIG. 3B, for the arguments of the extended prefetch command 62b, as information specifying the utilization time, the utilization start time n and the utilization finish time m of the data area yyy to be prefetched, are specified. The data area yyy is accessed for the first time by the load command 64, n steps after the insert position of the extended prefetch command 62b, and is accessed for the last time by the store command 68, m steps after said insert position. In other words, only in the section marked with diagonal lines will the data area yyy be accessed. Thus, by specifying both the utilization start time n and the utilization finish time m of the data area yyy it is possible to define the period during which the cache of the data area yyy should be locked.

In the example in FIG. 3C, for the arguments of the extended prefetch command 62c, the utilization start time n of the data area yyy to be prefetched, and the priority c, are specified. The priority c is used to decide which prefetch command should be issued first when multiple prefetch commands are registered. The priority c is also used to decide which cache data should be cached out first when the prefetched data is cached out.

In the example in FIG. 3D, for the arguments of the extended prefetch command 62b, as information specifying the utilization time of the data area yyy to be prefetched, the utilization start time n, and the utilization finish time m, which were previously described, are specified, and in addition the priority c is also specified.

Figure 4:
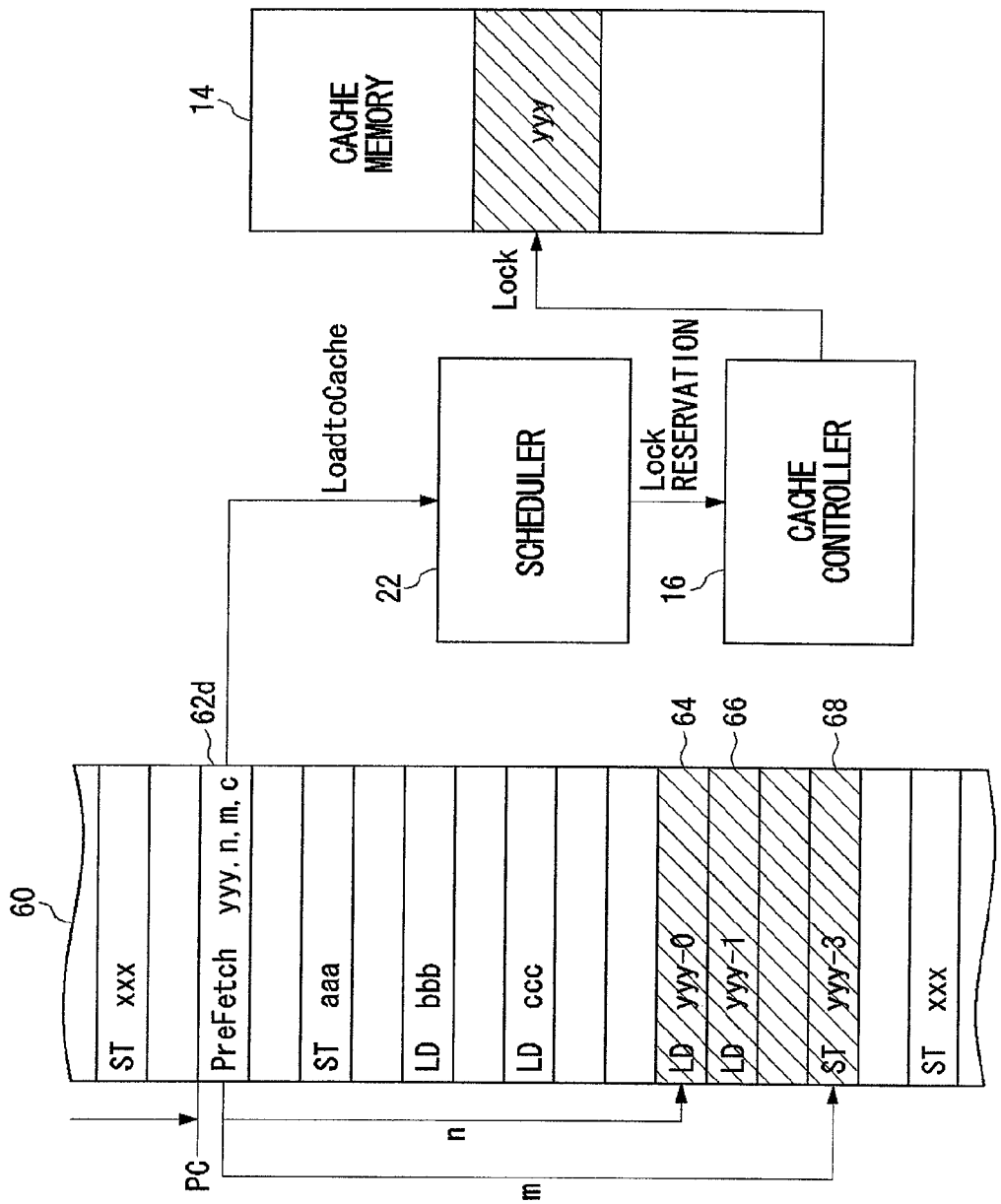
FIG. 4 is a diagram describing how a cache of the cache memory of FIG. 1 is locked by issuance of an extended prefetch command.

FIG. 4 is a diagram describing how the cache of the cache memory 14 is locked by issuance of the extended prefetch command. Here, an explanation is given using the extended prefetch command 62d in FIG. 3D as an example. When the program 60 is executed by the CPU 12, and the program counter PC reaches the position as shown in the diagram, the prefetch command 62d is issued. Using the following parameters in the prefetch command: the data area yyy; the utilization start time n; the utilization finish time m; the priority c; and the program counter PC value pc, the CPU 12 issues the just-in-time protocol LoadtoCache (yyy, pc, n, m, c) to the scheduler 22.

The scheduler 22, which received a just-in-time protocol issued by the CPU 12, gives instruction to the cache controller 16 to make a reservation to lock the cache of the data area yyy up to (pc+m) steps from the current program counter PC value pc. Based on the static characteristics such as the latency and bandwidth of the resources like DRAM and I/O to be accessed, and the dynamic condition of the request queues of the resources, the scheduler 22 schedules the issuance timing of the prefetch command 62d and sets up the actual protocol in the request protocol queues of the resources. At the point when the actual protocol is issued, the scheduler 22 gives instruction to start locking the cache of the data area yyy to the cache controller 16. The cache controller 16 locks the cache of the data area yyy during the period from the point when the instruction to start locking is received to the point when locking is finished, which is specified by the instruction making a reservation.

Figure 5:
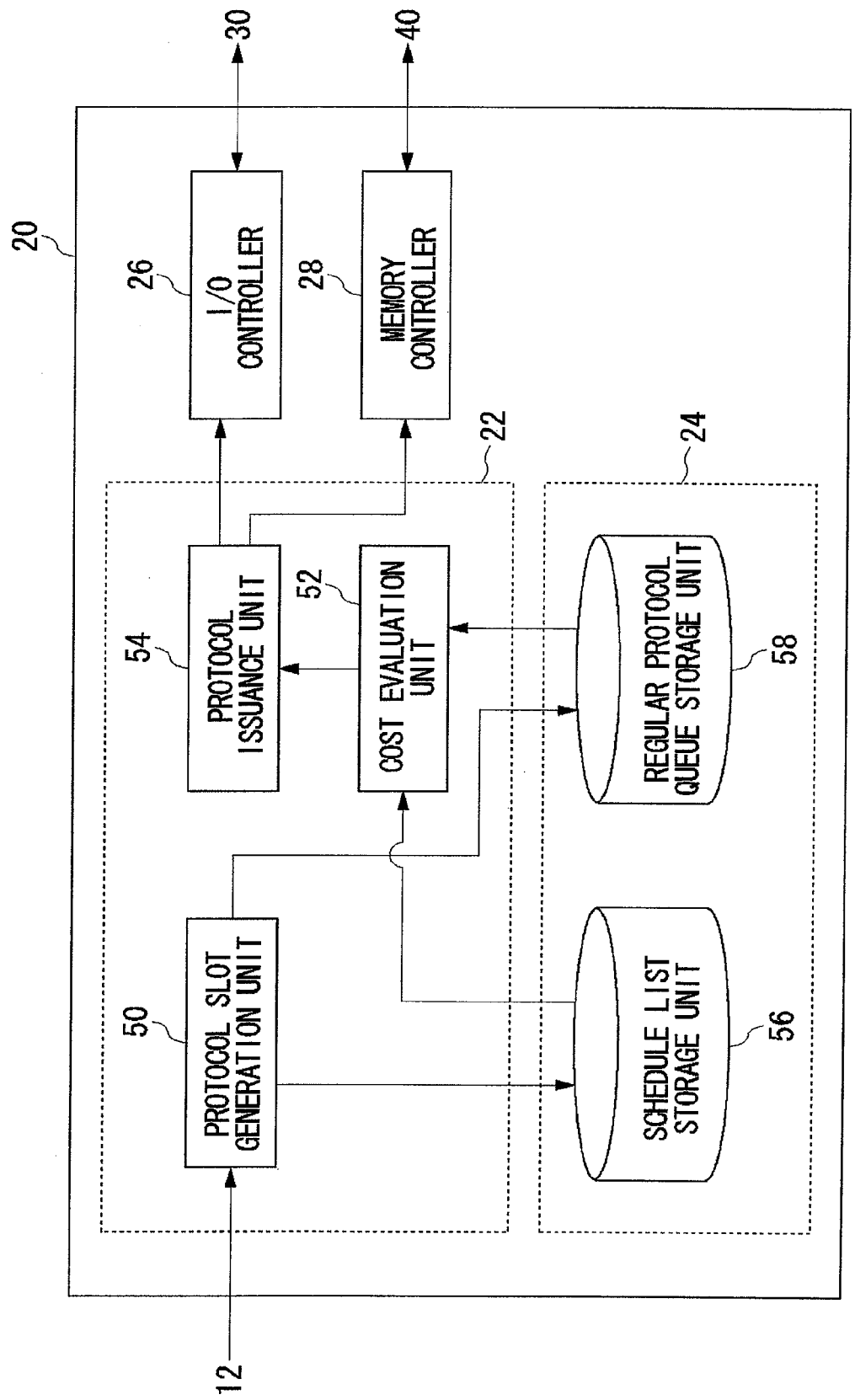
FIG. 5 is a block diagram showing the bridge module of FIG. 1 in terms of its functions.

FIG. 5 is a block diagram showing the bridge module 20, which was described in FIG. 1, in terms of its functions. The protocol slot generation unit 50, the cost evaluation unit 52, and the protocol issuance unit 54, are included in the configuration of functions in the scheduler 22 in FIG. 1. The schedule list storage unit 56 and the regular protocol queue storage unit 58 are included in the configuration of functions in the buffer memory 24 in FIG. 1.

The protocol slot generation unit 50 receives access protocols from the CPU 12. For access protocols, there is the just-in-time protocol based on the extended prefetch command, and the regular access protocol based on the regular load command or store command.

Figure 6:
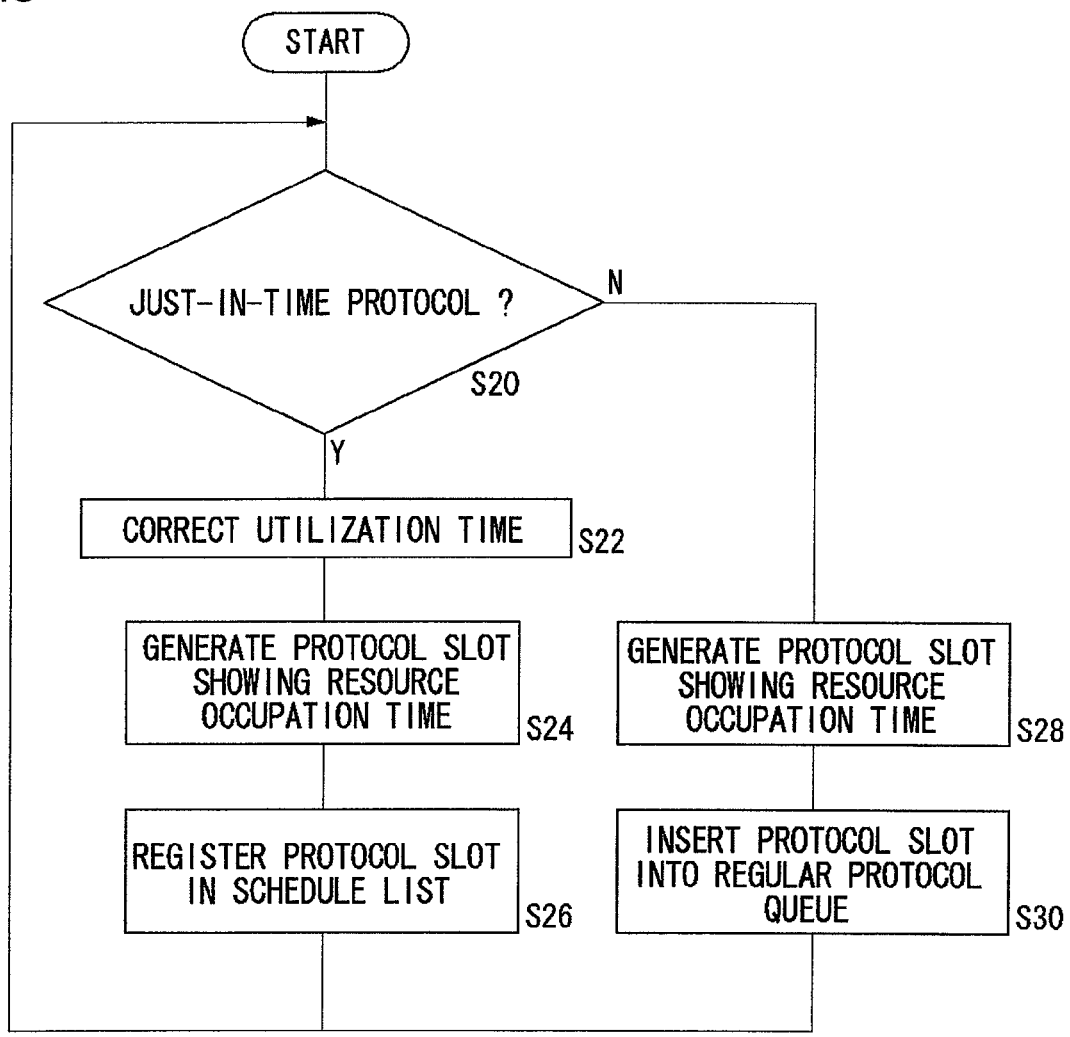
FIG. 6 is a flowchart describing a protocol slot generation process by the protocol slot generation unit of FIG. 5.

FIG. 6 is a flowchart describing the protocol slot generation process by the protocol slot generation unit 50. First, the protocol slot generation unit 50 identifies the type of access protocol received from the CPU 12, whether a just-in-time protocol or other (S20). If it is a just-in-time protocol (Y of S20), the utilization time, which was specified to be n steps from the program counter PC value pc by the extended prefetch command, is corrected based on the unit time of the counter in the scheduler 22 (S22). Next, the protocol slot is generated, which shows the time when the resource will be occupied by the access based on this just-in-time protocol (S24). The generated protocol slot is registered in the schedule list 70 of the just-in-time protocol stored in the schedule list storage unit 56 (S26).

In Step S20, when the access protocol received from the CPU 12 is not a just-in-time protocol (N of S20), the protocol slot generation unit 50 processes this access protocol as a regular protocol and generates the protocol slot indicating the resource occupation time (S28). The generated protocol slot is inserted into the regular protocol queue 90 stored in the regular protocol queue storage unit 58 (S30).

Figure 7:
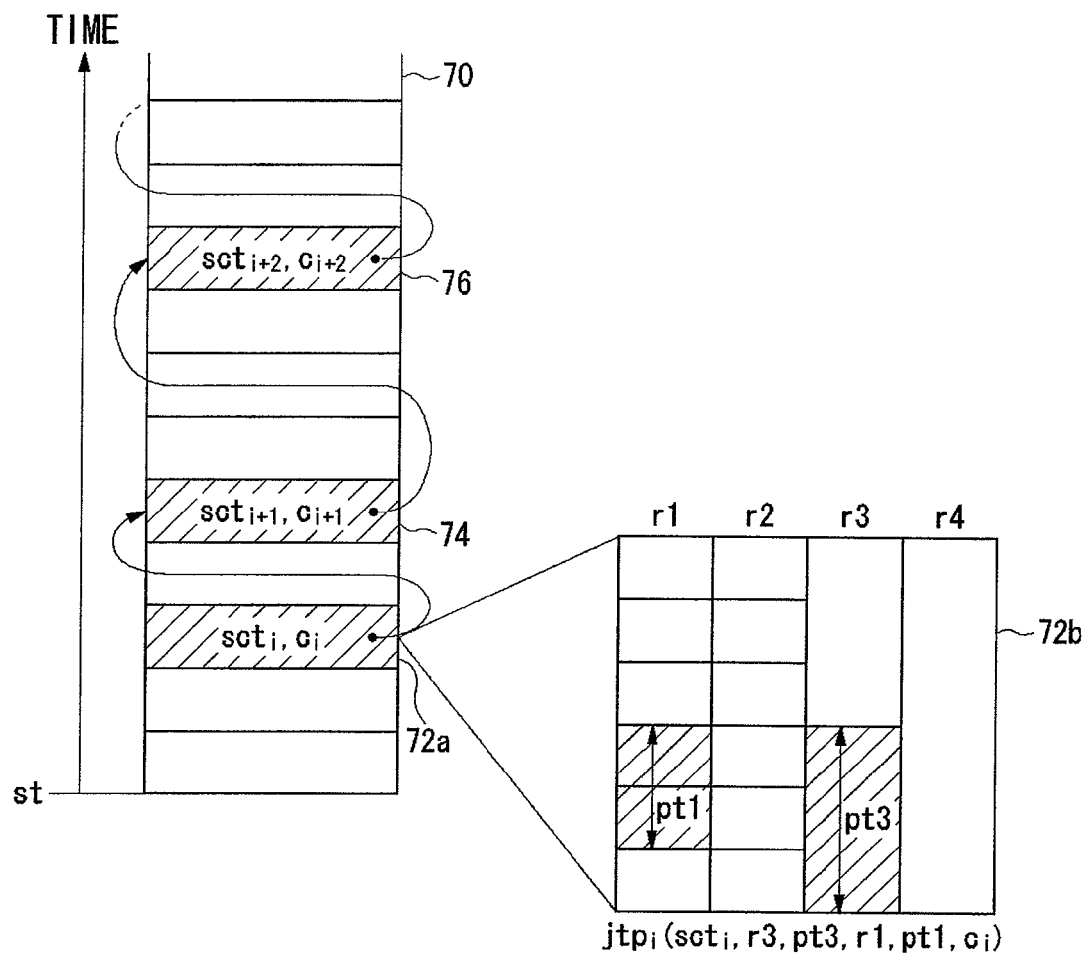
FIG. 7 is a diagram describing a schedule list of a just-in-time protocol stored in the schedule list storage unit of FIG. 5.

FIG. 7 is a diagram describing the schedule list 70 of the just-in-time protocol stored in the schedule list storage unit 56 in FIG. 5. Setting the time, which has been corrected based on the unit time of the counter of the scheduler 22, on the vertical axis, the registration state at the present time st of the protocol slot of the schedule list 70 is diagrammatically shown. The schedule list 70 is divided into the minimum units of time for the counter of the scheduler 22. As marked with diagonal lines, the slots 72a, 74, and 76 of the just-in-time protocol are respectively stored after a period of 2 units of time, 4 units of time, and 8 units of time, from the present time st. This means that the utilization times of the data prefetched by these protocol slots 72a, 74, and 76 are respectively (st+2), (st+4), and (st+8). However, this diagram is only a pattern diagram to facilitate understanding by showing the storage positions of the protocol slots in accordance with the utilization start time specified by each protocol slot. In actual implementation, the protocol slots are registered in the schedule list 70, with a combination of the utilization time $sct_i$ and the priority $c_i$ as an index, and they are sorted in an order starting from the earliest utilization time $sct_i$ to form a list structure connected as shown with the pointers in the diagram.

A just-in-time protocol is generally written as jtp (sct, $r_{from}$, $pt_{from}$, $r_{to}$, $pt_{to}$, c). Here, the first parameter sct is the utilization time and the sixth parameter c is the priority. The second parameter $r_{from}$ is the data transfer resource and the fourth parameter $r_{to}$ is the data receiving resource. The third parameter $pt_{from}$ is the time that the data transfer resource is occupied and the fifth parameter $pt_{to}$ is the time that the data receiving resource is occupied. The resource occupation time is determined based on the data transfer speed and latency of the resource etc. For example, for resources, there are DRAM, I/O, cache memory etc. Data transfer from I/O to cache memory or data transfer from cache memory to I/O can be described using this description method.

In the example of FIG. 7, there are four kinds of resources r1 through r4 to be accessed. The just-in-time protocol $jtp_i$ is an access protocol to transfer data by occupying the data transfer resource r3 and the data receiving resource r1, respectively, for the occupation time pt3 and pt1. This protocol can be written as $jtp_i$ ($sct_i$, r3, pt3, r1, pt1, $c_i$). As shown in the diagram, the data structure 72b of the protocol slot 72a of the just-in-time protocol $jtp_i$ is to specify the occupation time pt1 of the first resource r1 and the occupation time pt3 of the third resource r3.

Here, within the four resources r1 through r4, as for the first resource r1 and the second resource r2, their occupation time is counted based on the minimum time unit of the counter of the scheduler 22. Meanwhile, the occupation time of the third resource r3 is counted based on a double-length time unit and the occupation time of the fourth resource r4 is counted based on a quadruple-length time unit. This is because the minimum unit for an access occupation time varies with the resource. In the following, to make the description simple, the occupation time will be expressed based on the minimum unit of the counter of the scheduler 22 regardless of what the minimum unit of the access occupation time for each resource is. For example, in the just-in-time protocol $jtp_i$, the third resource r3 is occupied for just 1 unit of time based on the minimum unit of access occupation time of the third resource r3. However, this corresponds to 3 units of time in terms of the minimum unit of the counter of the scheduler 22. So, for the sake of convenience, the occupation time pt3 of the third resource r3 is expressed based on the minimum unit of the counter of the scheduler 22, which comes out to be 3 units of time. Therefore, the just-in-time protocol $jtp_i$ can be written as $jtp_i$ ($sct_i$, r3, 3, r1, 2, $c_i$). Here, the occupation start time of the data receiving resource r1 is 1 unit later than the occupation start time of the transfer resource r3. This means that the data transfer to the data receiving resource r1 does not start until 1 unit of time has passed after the start of the access of the data transfer resource r3.

Figure 8:
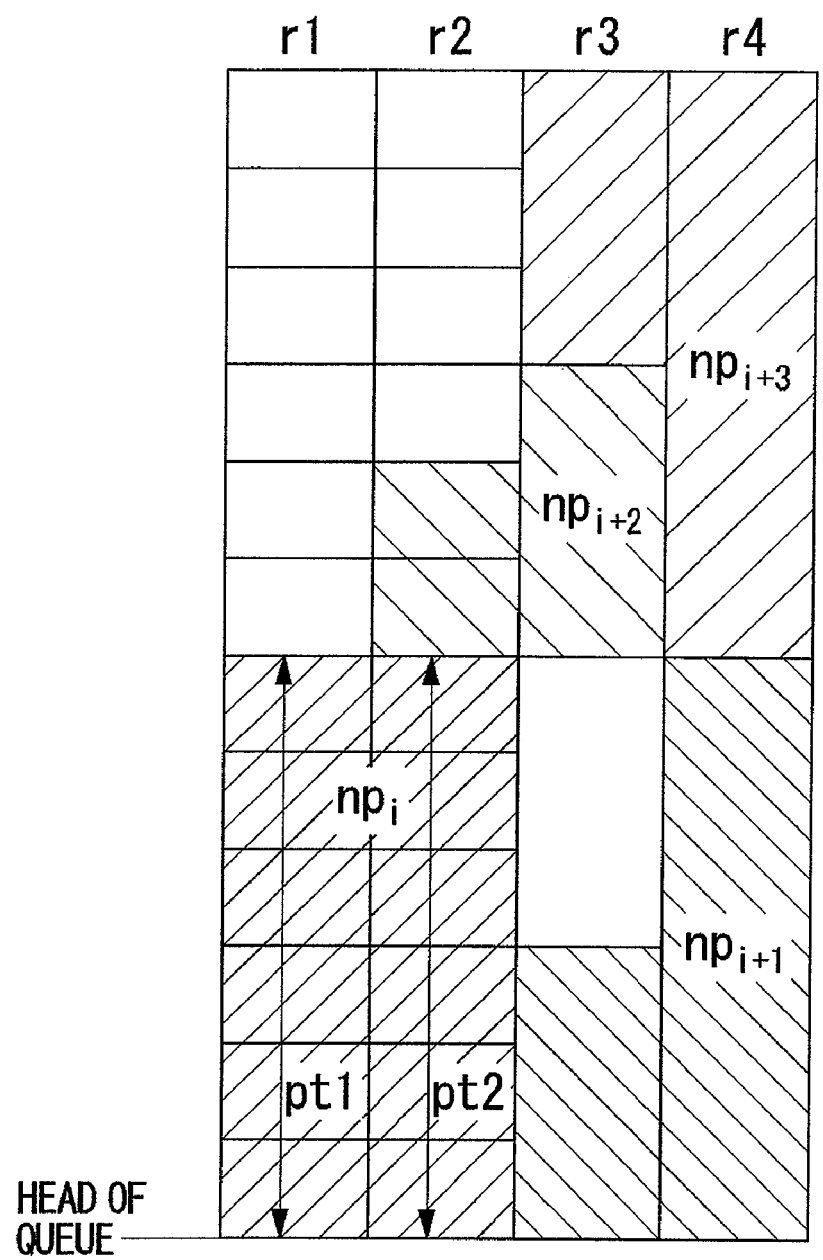
FIG. 8 is a diagram describing a regular protocol queue stored in the regular protocol queue storage unit of FIG. 5.

FIG. 8 is a diagram describing the regular protocol queue 90 stored in the regular protocol queue storage unit 58 in FIG. 5. The regular protocol is issued from the CPU 12 by the actual data access timing, which is different from the just-in-time protocol issued from the CPU 12 in advance of the data access. The protocol slot generation unit 50 inserts the regular protocol slots one after another in order starting from the first one sent from the CPU 12 to the last in the regular protocol queue 90. However, the protocol slot generation unit 50 can optimize the protocol slots registered in the regular protocol queue 90 by changing the order so that there is no vacant time, or change the sequence based on priority.

The regular protocol can be generally written as np ($r_{from}$, $pt_{from}$, $r_{to}$, $pt_{to}$, c). The definition of parameters is the same as the case for the just-in-time protocol. The priority c, which is the fifth parameter, is an option and it may not be used in some cases. The utilization method of the priority c is the same as the case for the just-in-time protocol. In the example in FIG. 8, at the present time st, the slots of the regular protocols from ith to (i+3)th, which are $np_i$, $np_{i+1}$, $np_{i+2}$, and $np_{i+3}$, are registered in the regular protocol queue 90. The regular protocols from ith to (i+3)th can be written respectively as $np_i$ (r1, 6, r2, 6, $c_i$), $np_{i+1}$ (r3, 3, r4, 6, $c_{i+1}$), $np_{i+2}$ (r2, 2, r3, 3, $c_{i+2}$), and $np_{i+3}$ (r4, 6, r3, 3, $c_{i+3}$). The regular protocols in the output slot located at the head of the regular protocol queue 90 are taken out in sequence and issued.

With reference again to the functional configuration diagram in FIG. 5, the cost evaluation unit 52 evaluates the issuance cost of the regular protocol in a wait status in the regular protocol queue 90, and the issuance cost of the just-in-time protocol registered in the schedule list 70, and compares these issuance costs. The protocol issuance unit 54 issues the protocol with the smaller issuance cost. Based on the resource ID, the issued protocol is sent to the I/O controller 26 if it is a command for I/O, and to the memory controller 28 if it is a command for a main memory like DRAM, and executed.

Figure 9:
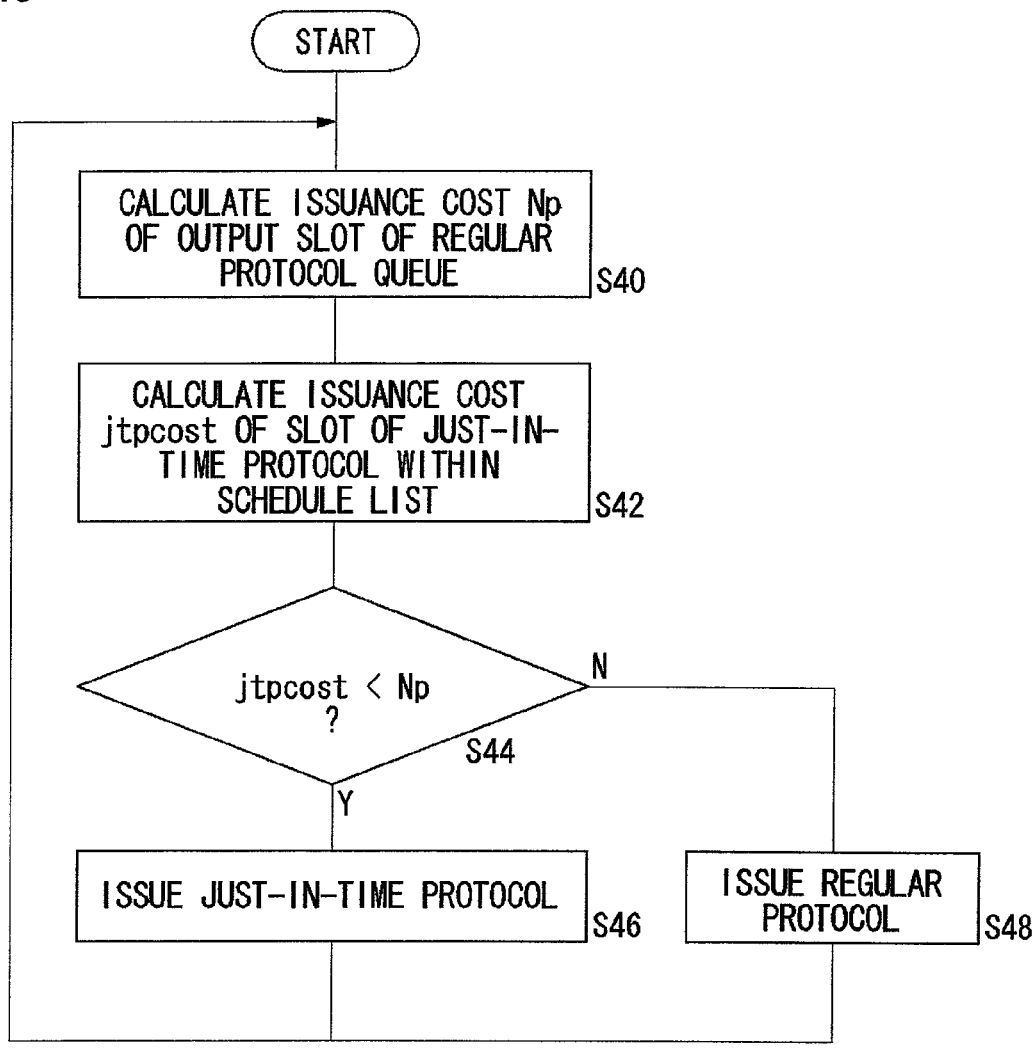
FIG. 9 is a flowchart showing an evaluation process for an issuance cost of access protocol by the cost evaluation unit of FIG. 5.
Figure 10:
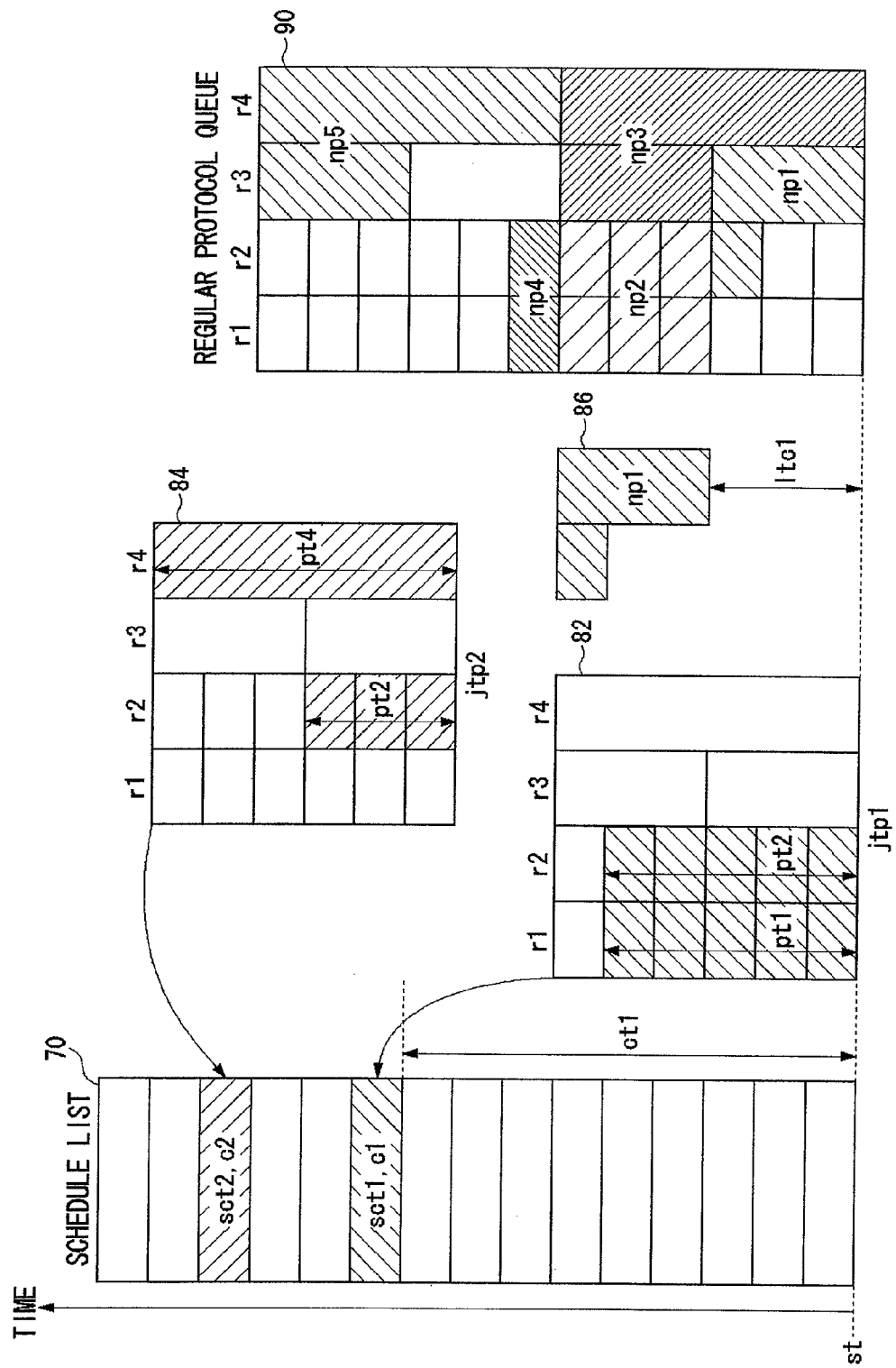
FIG. 10 is a diagram describing a schedule list, and a registration state of protocol slots in a regular protocol queue.

FIG. 9 is a flowchart showing the evaluation process for the issuance cost of access protocol by the cost evaluation unit 52. FIG. 10 is a diagram describing the schedule list 70, and the registration state of the protocol slots in the regular protocol queue 90. Explanation will be given with reference to these diagrams.

The cost evaluation unit 52 calculates the regular protocol issuance cost Np (S40). The regular protocol issuance cost Np is generally a function of the regular protocol np in the output slot of the regular protocol queue 90 and the present time st. Here, as shown in the formula below, when a regular protocol np in the output slot is issued, the cost Np can be obtained by calculating the linear sum of the cost $Rc_{from}(t)$ due to the data transfer resource $r_{from}$ being occupied at the time t, and the cost $RC_{to}(t)$ due to the data receiving resource $r_{to}$ being occupied at the time t.

$$Np=np\_cost\_func(np,st)=Rc_{from}(st)+RC_{to}(st+\alpha)$$

Here, the constant $\alpha$ is the time difference between the occupation start time of the data transfer resource and the occupation start time of the data receiving resource.

In the example of the regular protocol queue 90 in FIG. 10, the regular protocol np1 exists in the output slot. If this regular protocol np1 is issued at the present time st, access to the data transfer resource r3 starts at the present time st, and the data transfer resource r3 is occupied for just 3 units of time. The occupation cost for this time is calculated by $RC_3(st)$. Meanwhile, access to the data receiving resource r2 starts 2 units of time later, and the data receiving resource r2 is occupied for just 1 unit of time. The occupation cost for this time is calculated by $RC_2(st+2)$. Therefore, the regular protocol issuance cost Np is calculated by the formula: $Np=RC_3(t)+RC_2(t+2)$.

Next, the cost evaluation unit 52 calculates the just-in-time protocol issuance cost jtpcost (S42). The cost evaluation unit 52 does the evaluation of the issuance cost jtpcost in regard to all the protocol slots registered within the schedule list 70. However, the issuance cost jtpcost may be evaluated for only the protocol slot with the utilization time sct, which is the closest to the present time st, or the protocol slot with the highest priority c. Also, the issuance cost jtpcost may be evaluated for several protocol slots in an order starting from the utilization time sct, which is the closest to the present time st, or for several protocol slots in an order starting from the protocol slot with the highest priority c. In the example in FIG. 10, in the schedule list 70 the slots for two just-in-time protocols jtp1 (sct1, r1, pt1, r2, pt2, c1) and jtp2 (sct2, r2, pt2, r4, pt4, c2) are registered. The cost evaluation unit 52 individually calculates the issuance costs jtpcost1 and jtpcost2 for the respective protocol slots.

The just-in-time protocol issuance cost jtpcost is calculated based on a combination of several cost factors. The first cost factor is the regular protocol issuance lag cost LC. This is the cost per unit of time accrued due to an issuance lag of the regular protocol, which is in a wait status in the regular protocol queue 90 when the just-in-time protocol is issued. This regular protocol issuance lag cost LC is generally a function applied to all the regular protocols stored in the regular protocol queue 90. Here, it is the linear sum of the lag costs LCs($np_i$) calculated for the respective regular protocols $np_i$. In the example of FIG. 10, at the present time st five regular protocols, np1 through np5, are in a wait status in the regular protocol queue 90, therefore, the regular protocol issuance lag cost LC is calculated by the following formula:

$$LC=Lcfunc(np1,np2,np3,np4,np5)=LC(np1)+LC(np2)+LC(np3)+LC(np4)+LC(np5)$$

Here, the lag cost LC($np_i$) is the cost accrued when the issuance of the regular protocol $np_i$ has a lag time of just 1 unit of time.

When the priority $c_i$ is specified in the regular protocol $np_i$ the lag cost is written as LC($np_i$, $c_i$), and its value may be set so that it reflects the priority $c_i$ for each regular protocol $np_i$. For example, the lag cost LC($np_i$, $c_i$) may be evaluated higher for the regular protocol $np_i$ with a high priority $c_i$.

In the example in FIG. 10, when the first just-in-time protocol jtp1 (sct1, r1, pt1, r2, pt2, c1) is issued, as shown in the slot 82 of this protocol, the data receiving resource r2 is occupied for 5 units of time from the present time st, which overlaps the time for which the resource r2 is occupied by the regular protocol np1 in the output slot of the regular protocol queue 90. Therefore, to execute the just-in-time protocol jtp1, as shown in the figure, the output slot 86 of the regular protocol queue 90 must be shifted backward by ltc1 time, in other words 3 units of time. By having the regular protocol np1 in the output slot 86 delay for 3 units of time, other regular protocols np2 through np5, which are in a wait status in the regular protocol queue 90, also delay for 3 units of time as a whole. Therefore, as a whole, by issuance of the just-in-time protocol jtp1, the cost LC*ltc1, which is the regular protocol issuance lag cost LC multiplied by the lag time ltc1 of the output slot 86, accrues.

In the same way, when the second just-in-time protocol jtp2 is issued, the lag time ltc2 can be calculated based on the competing relationship over the resource occupation time between the slot 84 of this protocol and the protocol slots within the regular protocol queue 90. In general, the regular protocol issuance lag cost accrued from the issuance of the just-in-time protocol $jtp_i$ is calculated by the formula: LC*$ltc_i$.

The second cost factor of the just-in-time protocol issuance cost jtpcost is the cache retention cost CacheRC of the prefetched data. This is the cost per unit of time, which accrues due to the prefetched data staying in the cache memory 14 when the just-in-time protocol is issued. The value $ct_i$=($sct_i$−st), which is the present time st subtracted from the utilization time $sct_i$ of the data to be prefetched by the just-in-time protocol $jtp_i$, equals the time that the prefetched data stays in the cache memory 14 when the just-in-time protocol $jtp_i$ is issued at the present time st. Therefore, the cache retention cost accrued due to the issuance of the just-in-time protocol $jtp_i$ at the present time st is calculated by CacheRC*($sct_i$−st): the cache retention cost CacheRC per unit of time multiplied by the retention time $ct_i$=($sct_i$−st).

The third cost factor is the risk that the data being accessed is not prefetched by the specified utilization time due to an issuance delay of the just-in-time protocol $jtp_i$. With the just-in-time protocol $jtp_i$ and the present time st being the parameters of a function, it is calculated by Time_Limit_Func($jtp_i$, st). As an example, this risk is defined as shown in the formula below:

Time_Limit_Func($jtp_i$,st)={Time_Limit when $sct_i$−st<max($pt_{from}$,$pt_{to}$)+a, or otherwise 0}.

When the prefetched data cache retention time ($sct_i$−st) is less than the greatest value max($pt_{from}$, $pt_{to}$) of either the occupation time $pt_{from}$ of the data transfer resource $r_{from}$ and the occupation time $pt_{to}$ of the data receiving resource $r_{to}$ resulting from prefetching, data prefetching cannot be completed by the utilization time $sct_i$. So, the cache retention time ($sct_i$−st) is compared to the value calculated by adding the constant a, which is given to allow some room, to max($pt_{from}$, $pt_{to}$). When the cache retention time ($sct_i$−st) is less, the risk value shall be the positive constant Time_Limit, and when the cache retention time ($sct_i$−st) is greater, the risk value shall be 0.

The just-in-time protocol $jtp_i$ issuance cost $jtpcost_i$ at the present time St is calculated based on the above three cost factors as follows:

$$jtpcost_i=jtp\_cost\_func(st,jtp_i)=LC*ltc_i+(sct_i-st)*CacheRC-Time\_Limit\_Func(jtp_i,st)$$

The third term Time_Limit_Func($jtp_i$, st) takes a positive value when a situation draws near in which prefetching cannot be completed, and its value is subtracted from the sum of the first term LC*$ltc_i$ and the second term ($sct_i$−st)*CasheRC, which results in lowering the value of $jtpcost_i$ as a whole. Therefore, in a situation in which it appears that keeping of the just-in-time protocol will be difficult, a balance is struck between the cost accrued by executing the just-in-time protocol and the risk carried by not executing the just-in-time protocol.

Going back to FIG. 9, when the just-in-time protocol issuance cost jtpcost is smaller than the regular protocol issuance cost Np at the present time St (Y of S44), the protocol issuance unit 54 issues a just-in-time protocol (S46), and if the just-in-time protocol issuance cost jtpcost is not smaller (N of S44), the protocol issuance unit 54 issues a regular protocol (S48). Once one of the two protocols is issued, the process goes back to Step S40. Then, a new cost calculation is done at that time point and based on the cost evaluation at each time point an appropriate protocol is selected and issued.

In the example of FIG. 10, the first just-in-time protocol jtp1 issuance cost jtpcost1, and the second just-in-time protocol jtp2 issuance cost jtpcost2, which are registered in the schedule list 70, and the issuance cost Np of the regular protocol np1 in the output slot of the regular protocol queue 90, are compared, and the smallest cost protocol is issued by the protocol issuance unit 54. Here, it must be noted that the just-in-time protocol issuance cost needs to be re-calculated for each time because the wait state of a protocol within the regular protocol queue 90 varies each time and accordingly the value of the first term, LC*$ltc_i$ of the issuance cost calculation formula, changes. Also, there is the possibility of the values associated with the relation between the first just-in-time protocol jtp1 issuance cost jtpcost1 and the second just-in-time protocol jtp2 issuance cost jtpcost2 changing each time due to the same reason above. So, there is no guarantee that the just-in-time protocol with a utilization time sct, which is closer to the present time st, will have a smaller issuance cost.

In addition, the just-in-time protocol issuance cost $jtpcost_i$ may be evaluated by only partially using the three cost factors. For example, the evaluation can be made by the following formula using only Cache retention cost:

$$jtpcost_i = (sct_i - st) * CacheRC$$

Also, the following formula can be used for evaluation, which also includes use of the risk factor that prefetch cannot be completed:

$$jtpcost_i = (sct_i - st) * CacheRC - Time\_Limit\_Func(jtp_i, st)$$

When using the above formulae, the just-in-time protocol issuance cost can be evaluated independently of the condition of the protocol slot of the regular protocol queue 90, which simplifies cost calculation.

As has been described so far, according to the embodiments, by specifying a utilization time of data to be prefetched in the prefetch command, it is possible to predict a period of time for which the prefetched data stays in the cache, which enables decision making about the issuance timing of the prefetch command through evaluating the cache retention cost. Further, by making a cost evaluation in consideration of the competing relationship between the resource occupation times, it is possible to issue a prefetch command while striking a balance with other access command executions. As a result, the prefetch command is not executed needlessly but according to a plan and the cache usability is improved.

Although the present invention has been described by way of exemplary embodiments, it should be understood that many changes and substitutions may be made by those skilled in the art without departing from the scope of the present invention which is defined by the appended claims. Some such alterations are stated as follows.

In the description above, in the extended prefetch command, the utilization start point and finish point of the prefetched data were specified based on the relative number of steps counted from the insert position of the extended prefetch command. However, the utilization start point and finish point of the prefetched data may be specified based on an absolute time.

Further, in the description above, the issuance costs for both the just-in-time protocol and regular protocol are calculated and compared to decide which access protocol shall be issued. However, it is also acceptable to simply calculate the just-in-time protocol issuance cost and if its value is equal to or below a specified value the decision to issue a just-in-time protocol may be made.

What is claimed is:

1. A tangible storage medium storing a computer program executable by a computer, the computer program comprising:
analyzing a source code and converting the source code into an intermediate code;
determining data to be prefetched based on the intermediate code, and then inserting an access command for the data as a prefetch command into a position before an original execution sequence position, and adding information specifying a utilization time of the data in the prefetch command; and
optimizing the intermediate code into which the prefetch command is inserted and generating an object code.

2. The tangible storage medium of claim 1, wherein the information specifying the utilization time includes information specifying a utilization start time of the data to be prefetched, which is defined by a relative position from a position where the prefetch command is inserted.

3. The tangible storage medium of claim 2, wherein the information specifying the utilization time further includes information specifying a utilization finish time of the data to be prefetched, which is defined by a relative position from a position where the prefetch command is inserted.

4. A method for generating an object code comprising:
analyzing a source code and converting the source code into an intermediate code;
determining data to be prefetched based on the intermediate code, and then inserting an access command for the data as a prefetch command into a position before an original execution sequence position, and adding information specifying a utilization time of the data in the prefetch command; and
optimizing the intermediate code into which the prefetch command is inserted and generating the object code.

5. A computer readable media storing an object code generated by the method of claim 4.

6. The method of claim 4, wherein the information specifying the utilization time includes information specifying a utilization start time of the data to be prefetched, which is defined by a relative position from a position where the prefetch command is inserted.

7. A computer readable media storing an object code generated by the method of claim 6.

8. The method of claim 6, wherein the information specifying the utilization time further includes information specifying a utilization finish time of the data to be prefetched, which is defined by a relative position from a position where the prefetch command is inserted.

9. A computer readable media storing an object code generated by the method of claim 8.

* * * * *